United States Patent
Nakasone (10) Patent No.: US 8,752,248 B2
(45) Date of Patent: Jun. 17, 2014

(54) HINGE DEVICE INCLUDING PRESSURE CONTACT SURFACES

(75) Inventor: Hisashi Nakasone, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 428 days.

(21) Appl. No.: 12/801,448

(22) Filed: Jun. 9, 2010

(65) Prior Publication Data

US 2010/0313384 A1 Dec. 16, 2010

(30) Foreign Application Priority Data

Jun. 11, 2009 (JP) ................................. 2009-139859

(51) Int. Cl.
*E05C 17/64* (2006.01)

(52) U.S. Cl.
USPC .................................. 16/342; 16/337; 16/341

(58) Field of Classification Search
USPC ........... 16/337, 339, 341, 342, 386, 254, 260, 16/265
See application file for complete search history.

(56) References Cited

U.S. PATENT DOCUMENTS

| | | | | | |
|---|---|---|---|---|---|
| 1,429,416 A | * | 9/1922 | Fade | ................................ | 16/330 |
| 1,956,040 A | * | 4/1934 | Meyer | ............................ | 16/340 |
| 2,477,877 A | * | 8/1949 | Jeffrey | ........................ | 24/265 B |
| 2,862,229 A | * | 12/1958 | Bacca | ............................ | 16/342 |
| 5,239,731 A | * | 8/1993 | Lu | .................................. | 16/340 |
| 5,274,882 A | * | 1/1994 | Persson | .......................... | 16/303 |
| 5,715,576 A | * | 2/1998 | Liu | ................................ | 16/342 |
| 5,799,371 A | * | 9/1998 | Lin | ................................ | 16/330 |
| 5,970,819 A | * | 10/1999 | Katoh | ............................ | 74/531 |
| 6,101,676 A | * | 8/2000 | Wahl et al. | ...................... | 16/342 |
| 6,381,808 B1 | * | 5/2002 | Kida | ................................ | 16/340 |
| 6,708,371 B2 | * | 3/2004 | Belchine, III | .................. | 16/386 |
| 7,996,958 B2 | * | 8/2011 | Tang | ................................ | 16/307 |
| 2002/0112319 A1 | * | 8/2002 | Kida | ................................ | 16/342 |
| 2004/0025299 A1 | * | 2/2004 | Higano et al. | .................. | 16/342 |
| 2006/0005356 A1 | * | 1/2006 | Amano et al. | .................. | 16/341 |

(Continued)

FOREIGN PATENT DOCUMENTS

CN  1202584 A  12/1998
JP  58-130568  9/1983

(Continued)

OTHER PUBLICATIONS

Japanese Office Action Dated Dec. 25, 2012 with English Translation.

(Continued)

*Primary Examiner* — Emily Morgan
(74) *Attorney, Agent, or Firm* — McGinn IP Law Group, PLLC (57) ABSTRACT

According to an aspect of the present invention, there is provided a hinge device including: a first member having a pair of pin insertion holes; a second member having a pair of pin support holes; a pair of pin members respectively inserted into the pin insertion holes and the pin support holes to support the first member and the second member, the pin members being rotatable with respect to the pin insertion holes and not rotatable with respect to the pin support holes; a spring supported between the pin members to bring the pin members into contact with the first member; and pressure contact surfaces provided between the pin members and the first member being brought into contact with each other by the spring.

15 Claims, 11 Drawing Sheets

(56) References Cited

U.S. PATENT DOCUMENTS

| | | | |
|---|---|---|---|
| 2007/0271735 A1* | 11/2007 | Ramsauer | 16/404 |
| 2008/0120809 A1 | 5/2008 | Nakasone | |
| 2010/0077565 A1* | 4/2010 | Huang | 16/342 |

FOREIGN PATENT DOCUMENTS

| | | | | |
|---|---|---|---|---|
| JP | 5-42742 | | 6/1993 | |
| JP | 09-267852 | * | 10/1997 | B65D 43/24 |
| JP | 09-267852 A | | 10/1997 | |
| JP | 11-044142 A | | 2/1999 | |
| JP | 2004-204948 A | | 7/2004 | |
| JP | 2008-133680 A | | 6/2008 | |

OTHER PUBLICATIONS

Chinese Office Action Dated Aug. 29, 2013 with English Translation.

* cited by examiner

HINGE DEVICE INCLUDING PRESSURE CONTACT SURFACES

CROSS-REFERENCE TO RELATED APPLICATION(S)

This application claims priority from Japanese Patent Application No. 2009-139859 filed on Jun. 11, 2009, the entire contents of which are incorporated herein by reference.

BACKGROUND

1. Field of the Invention

An aspect of the present invention relates to a hinge device for attaching a lid to, for example, an opening so as to be opened and closed.

2. Description of the Related Art

For example, between a driver seat and a passenger seat in a front portion of a vehicle, a center console or an arm rest is provided. In the center console or the arm rest, an accommodation portion is formed so that small articles are accommodated therein. To an opening of the accommodation portion, a lid is attached to be opened and closed through a hinge device. The hinge device may have a so-called free stop function in which the lid can be stopped at the opened state of an arbitrary opening angle so that the lid is not closed without holding by a hand, and a function in which a braking force is applied so as to slowly close the lid so that the opened lid is not suddenly closed.

JP-2008-133680-A discloses a free stop hinge including a hinge base and a hinge arm connected to the hinge base so as to freely rotate through a support shaft, bearing plates having shaft holes respectively in the hinge base and the hinge arm, a friction plate having shaft holes arranged between the bearing plates and a compression coil spring arranged for pressing the one bearing plate of the pair of bearing plates to the other bearing plate through the friction plate.

In JP-2008-133680-A, an outer end portion of the hinge base is bent to form the bearing plate, the bearing plate of the hinge arm is arranged inside thereof, and the friction plate is arranged between them. At an end of the support shaft, a stopper (caulking or C-ring) is provided so that the support shaft is prevented from slipping out from the shaft hole.

By a frictional force generated by pressing the one of the pair of bearing plates to the other bearing plate through the compression coil spring, the lid supported by the hinge arm is prevented from falling due to its weight, thereby holding the lid at an arbitrary opening angle (as the so-called free stop function).

In JP-2008-133680-A, one end of the compression coil spring abuts on the bearing plate of the hinge arm to press the bearing plate toward the bearing plate of the hinge base side, and the other end of the compression coil spring is supported by the bearing plate bent in the hinge base. Namely, the hinge arm is braked to the hinge base by the friction plate arranged only in one side of the compression coil spring. In a structure that a braking force is applied only by one end side of the compression coil spring, when the lid supported by the hinge arm is heavy, a sufficient braking force may not be occasionally obtained.

Further, in addition to the friction plate to apply the above-described braking force, the end of the support shaft needs to be caulked or attached with the C-ring to prevent the support shaft from slipping out from the shaft hole and fix the support shaft. Thus, the number of assembling processes or the number of parts is increased to increase a production cost.

SUMMARY

One of objects of the present invention is to provide a hinge device that can reduce the number of assembling processes or the number of parts so as to decrease a production cost and obtain a sufficient braking force.

According to an aspect of the present invention, there is provided a hinge device including: a first member having a pair of pin insertion holes coaxially arranged and separated from each other; a second member having a pair of pin support holes to be coaxially arranged with the pin insertion holes of the first member at outer sides thereof; a pair of pin members respectively inserted into the pin insertion holes and the pin support holes to support the first member and the second member, the pin members being rotatable with respect to the pin insertion holes and not rotatable with respect to the pin support holes; a compression spring supported between the pin members to push the pin members to come into contact with the first member; and pressure contact surfaces provided between the pin members and the first member being brought into contact with each other by the compression spring.

According to another aspect of the present invention, there is provided a hinge device including: a first member having a pair of pin insertion holes coaxially arranged and separated from each other; a second member having a pair of pin support holes to be coaxially arranged with the pin insertion holes of the first member at inner sides thereof; a pair of pin members respectively inserted into the pin insertion holes and the pin support holes to support the first member and the second member, the pin members being rotatable with respect to the pin insertion holes and not rotatable with respect to the pin support holes; an extension spring supported between the pin members to pull the pin members to come into contact with the first member; and pressure contact surfaces provided between the pin members and the first member being brought into contact with each other by the extension spring.

Each of the pressure contact surfaces may be tapered to be gradually reduced in diameter toward a direction where the respective pin member is pushed by the compression spring.

Or, each of the pressure contact surfaces may be tapered to be gradually reduced in diameter toward a direction where the respective pin member is pulled by the extension spring.

In each of the pressure contact surfaces, one of the first member and the pin member may have a groove, and the other of the first member and the pin member may have a protrusion to be fitted to the groove at a given angle.

In each of the pressure contact surfaces, the first member may have an inclined surface inclined to change in height along a rotating direction, and the pin member may have another inclined surface inclined to change in height along an opposite direction to the rotating direction.

According to the above configuration, since the pin members are respectively brought into contact with the first member by the compression spring or the extension spring arranged between the pin members and a braking force generated in the pressure contact surfaces is applied at two positions, the braking force can be increased.

Further, since the pair of pin members are respectively brought into contact with the first member by the one compression spring or the extension spring, a work or parts for preventing a slip-off is not necessary. Thus, the number of assembling processes or the number of parts in the hinge device can be reduced to lower a production cost.

DRAWINGS

FIGS. 9A and 9B show a using state of the fourth embodiment.

DETAILED DESCRIPTION

Now, referring to FIGS. 1 to 5, a hinge device according to a first embodiment will be described below.

Figure 4:
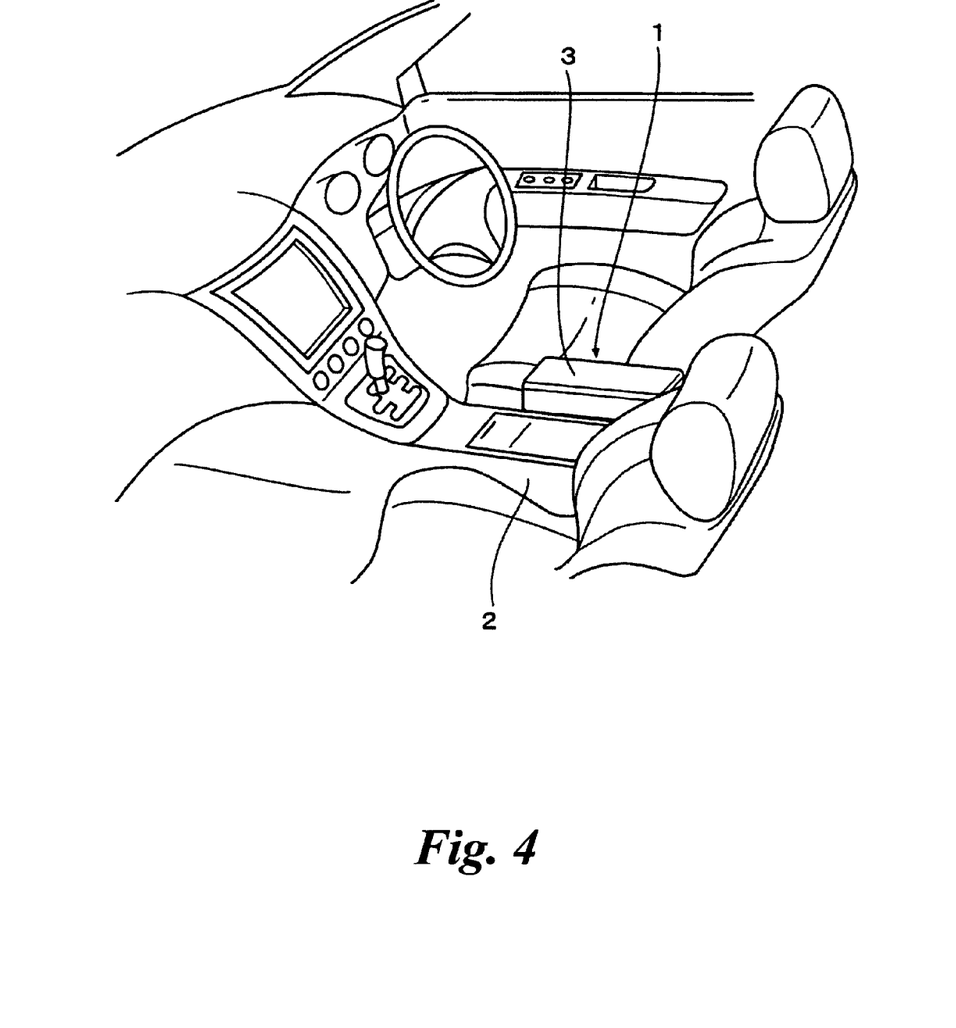
FIG. 4 is a perspective view showing one example of a portion to which the hinge device is applied.
Figure 5:
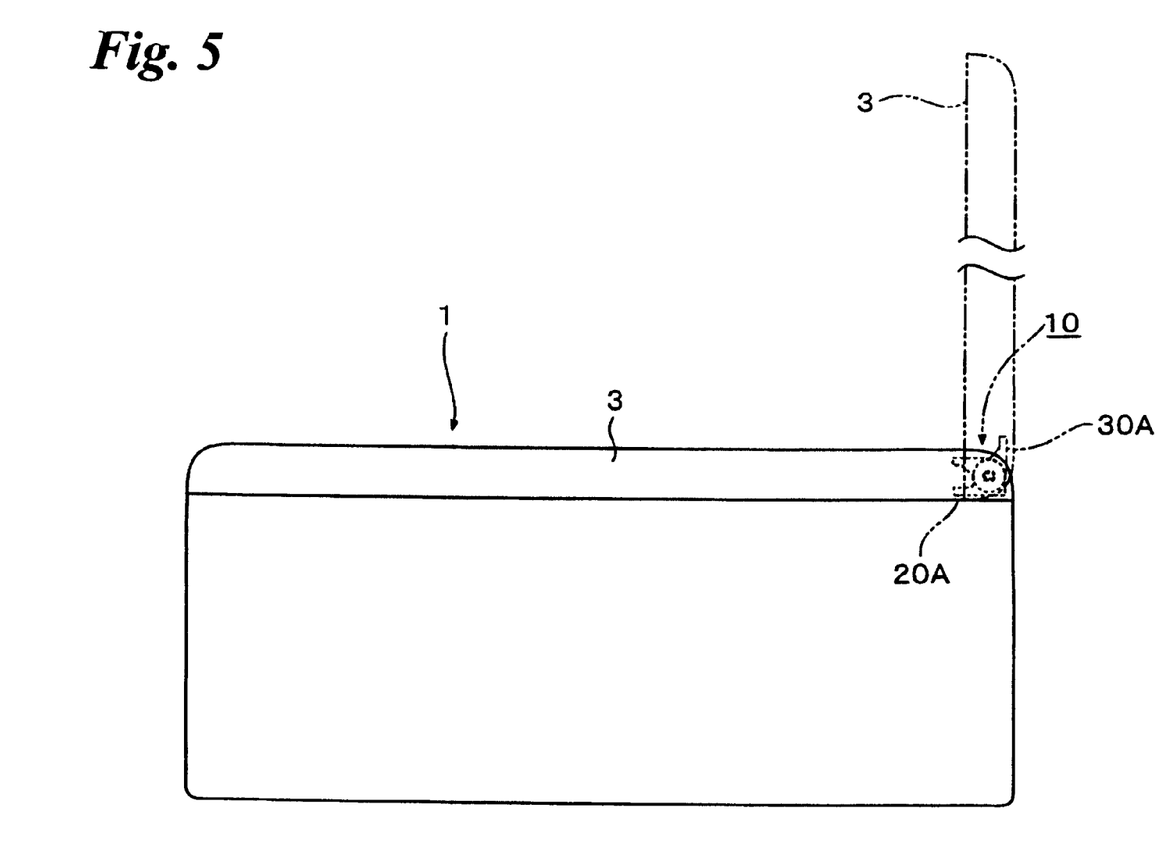
FIG. 5 is an explanatory view showing a state that the hinge device is used for opening and closing a lid.

As shown in FIG. 4, between a driver seat and a passenger seat in a front portion of a vehicle, an arm rest 1 and a center console 2 is arranged. In the center console or the arm rest, an accommodation portion is occasionally formed in which small articles can be accommodated. As shown in FIG. 5, the hinge device 10 of this embodiment is used to attach a lid 3 to an opening of the accommodation portion of the arm rest 1 so as to be opened and closed. As the hinge device is applied to members rotating relatively to each other, the hinge device may also be applied to a lid of a globe box, for example.

As shown in FIGS. 1 to 3B, the hinge device 10 of this embodiment includes a fixed hinge 20A having a pair of pin insertion holes 25a and 25a, a rotating hinge 30A having a pair of pin support holes 33a and 33a, a pair of pin members 40 and 40 for rotatably supporting both the fixed hinge 20A and the rotating hinge 30A, a compression spring 50 arranged between the pin members 40 and 40 to apply a rotation braking force between each pin member 40 and the fixed hinge 20A, and pressure contact surfaces T provided between the pin members 40 and the fixed hinge 20A brought into contact with each other under pressure by the compression spring 50.

In this embodiment, the fixed hinge 20A is functioning as a first member and the rotating hinge 30A is functioning as a second member. In this embodiment, the fixed hinge 20A is fixed to the arm rest 1 and the rotating hinge 30A is fixed to the lid 3. However, the rotating hinge 30A may be fixed to the arm rest 1 and the fixed hinge 20A may be fixed to the lid 3.

Figure 2:
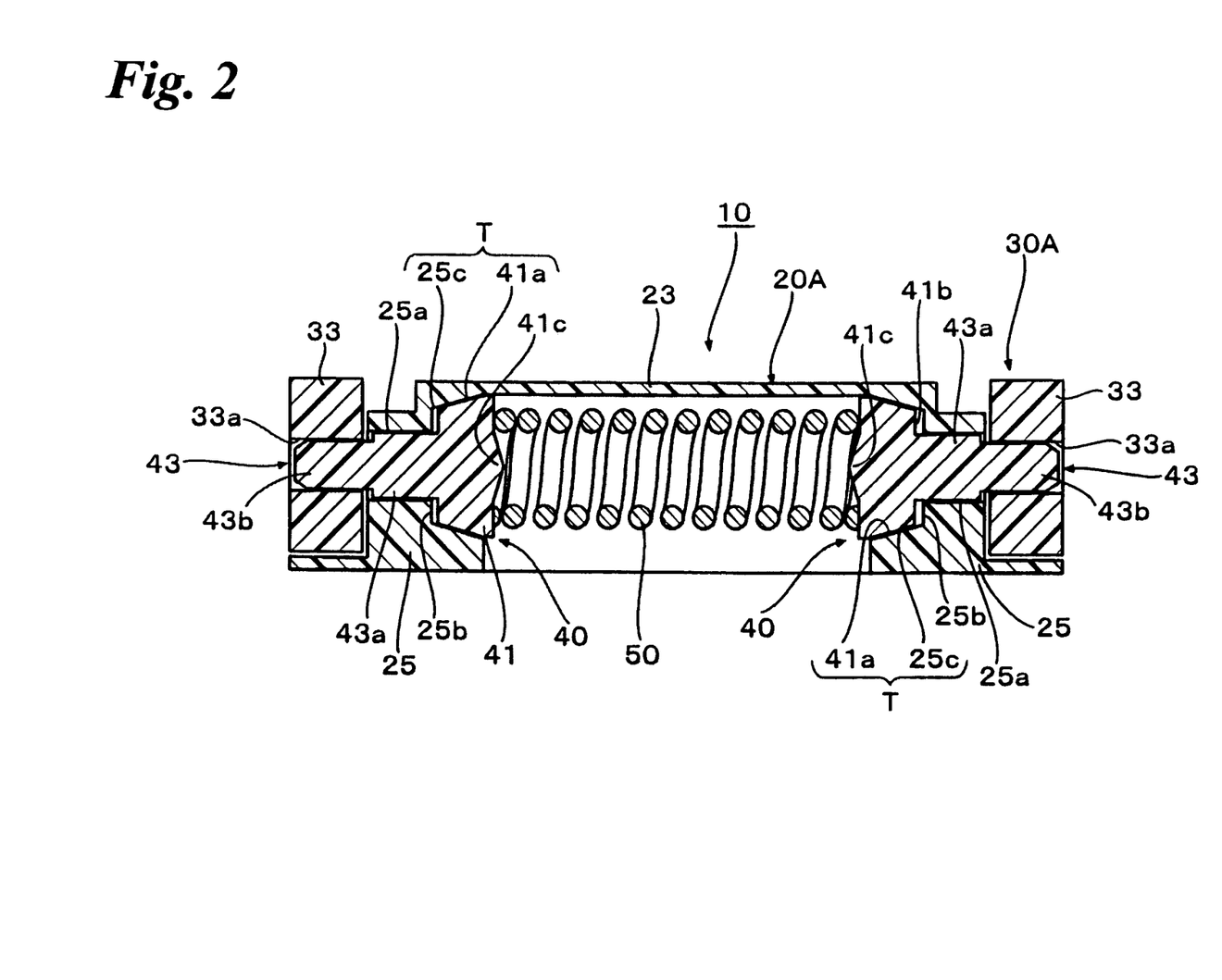
FIG. 2 is a sectional view of the hinge device.

Now, the members are respectively described below. The fixed hinge 20A includes a substantially-rectangular-shaped attachment portion 21 to be fixed to the accommodation portion of the arm rest 1, and a substantially-cylindrical-shaped accommodation portion 23 connected to the attachment portion 21. For example, the attachment portion 21 is fixed to an end of the accommodation portion of the arm rest 1, at a rear side of the vehicle. The accommodation portion 23 accommodates the pair of pin members 40 and 40 and the compression spring 50. The accommodation portion 23 is opened to the attachment portion 21 side. The accommodation portion 23 has wall portions 25 and 25 at both sides in the longitudinal direction, and the pair of substantially-circular-shaped pin insertion holes 25a and 25a are formed at central portions of both the wall portions 25 and 25 coaxially at a given interval to communicate with an inner portion of the accommodation portion 23 (see FIG. 2). Into the pin insertion holes 25a, rotating shaft portions 43a of the pin members 40 are inserted so as to freely rotate, respectively. As shown in FIG. 2, each wall portion 25 includes the pin insertion hole 25a, a stepped portion 25b and an inner peripheral surface 25c. The stepped portion 25b is radially outwardly extended from an inner-side (the accommodation portion 23 side) peripheral edge of the pin insertion hole 25a, and the inner peripheral surface 25c is extended from a circumferential edge of the stepped portion 25b and tapered to be gradually enlarged in diameter toward inside the accommodation portion 23.

Figure 1:
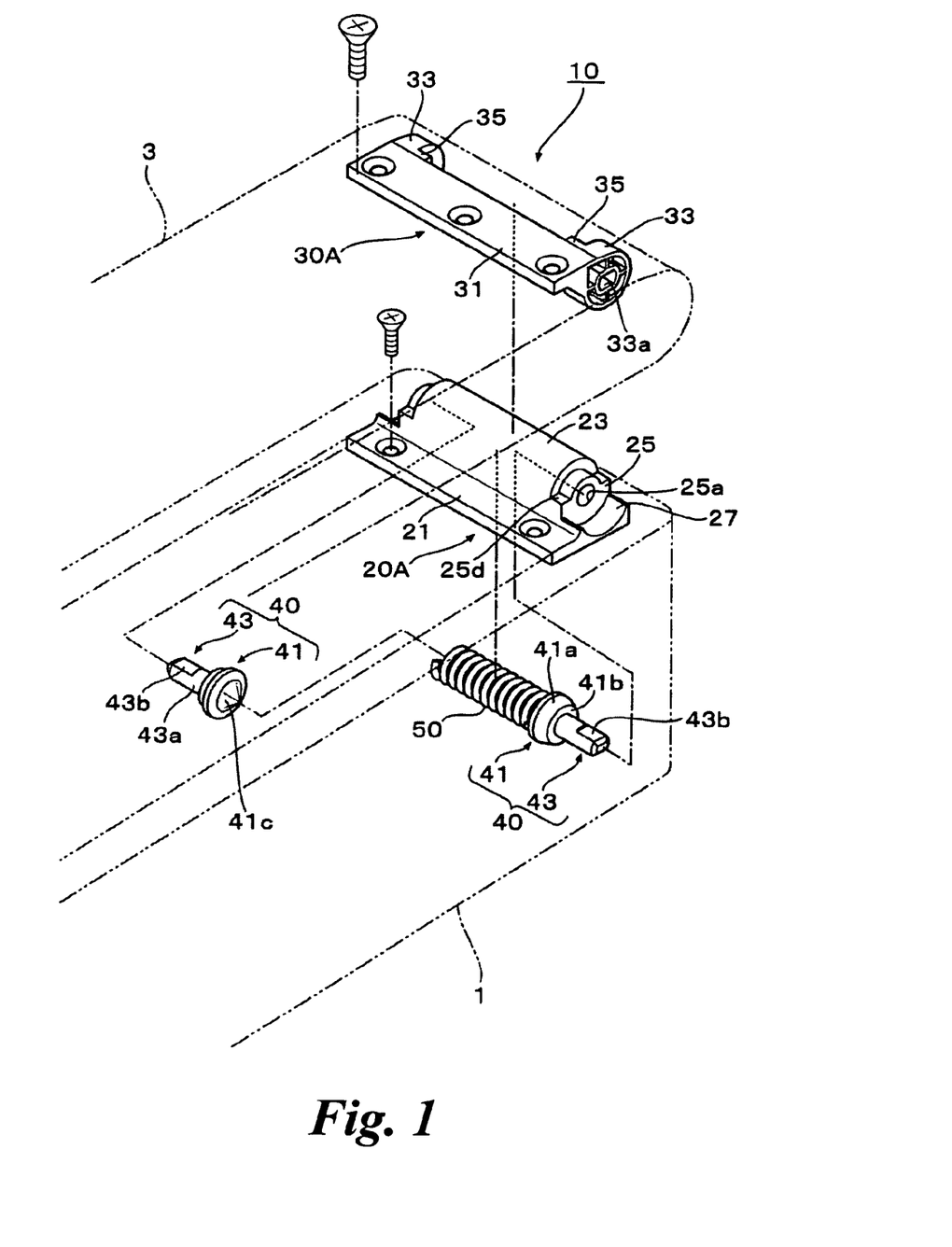
FIG. 1 is an exploded perspective view showing a hinge device according to a first embodiment.

As shown in FIG. 1, an outside upper portion (away from the attachment portion 21) of each wall portion 25 is cut out at along 180° in the circumferential direction of the accommodation portion 23 to form a rotation-regulation cut-out portion 25d. Rotation-regulation ribs 35 of the rotating hinge 30A are fitted to the rotation-regulation cut-out portions 25d, thereby regulating the rotating angle of the rotating hinge 30A.

On the attachment portion 21, receiving portions 27 and 27 recessed in substantially circular arc shapes are formed in more outer sides of both the wall portions 25 and 25. A pair of rotating portions 33 and 33 of the rotating hinge 30A are arranged therein.

The rotating hinge 30A is connected to the fixed hinge 20A so as to freely rotate. The rotating hinge 30A has a substantially plate-shaped attachment portion 31 to be fixed to the lid 3. The attachment portion 31 is extended to have a given length corresponding to a length of the attachment portion 21 of the fixed hinge 20A. At both ends in the longitudinal direction of the plate shaped attachment portion 31, the rotating portions 33 and 33 are protruded so as to be arranged at both the sides of the accommodation portion 23 and so as to sandwich the accommodation portion 23 therebetween. The rotating portions 33 and 33 are rotatably supported by the receiving portions 27 and 27.

At the central portions of the rotating portions 33 and 33, respectively, the pair of pin support holes 33a and 33a are formed so as to be coaxially arranged outside the pair of pin insertion holes 25a and 25a of the fixed hinge 20A. Each of the pin support holes 33a is formed to have an irregular shape in which opposed surfaces in the circumferential direction are cut out in parallel to each other. The irregular shape of the pin support holes 33a correspond to fixed shaft portions 43b of support shafts 43 of the pin members 40, so as to fix the pin members 40 while preventing rotations thereof.

At positions close to the attachment portion 31 inside the rotating portions 33, respectively, the rotation-regulation ribs 35 and 35 are protruded to enter the rotation-regulation cut-out portions 25d of the fixed hinge 20A, thereby regulating the rotating angle of the rotating hinge 30A. As a result, the rotating hinge 30A can rotate from a position (see FIG. 3A) where the attachment portion 31 of the rotating hinge 30A is substantially parallel to the attachment portion 21 of the fixed hinge 20A to a position (see FIG. 3B) where the attachment portion 31 of the rotating hinge 30A is substantially perpendicular to the attachment portion 21 of the fixed hinge 20A.

Now, the pair of pin members 40 and 40 will be described. The pin members 40 connect the fixed hinge 20A and the rotating hinge 30A to each other so as to freely rotate. As shown in FIGS. 1 and 2, each pin member 40 includes a head portion 41 and the support shaft 43 extending with a given length from the central portion of the end surface 41b of the head portion 41. An outer peripheral surface 41a of the head portion 41 is tapered to be gradually reduced in diameter toward the support shaft 43.

The pin members 40 and 40 are accommodated in the accommodation portion 23 of the fixed hinge 20A and pressed by the compression spring 50 so as to be separated from each other from an inner side to an outer side of the accommodation portion 23. Thus, the outer peripheral surfaces 41a of the pin members 40 are brought into contact with the tapered inner peripheral surfaces 25c of the fixed hinge 20, under pressure.

In this embodiment, the inner peripheral surfaces 25c of the fixed hinge 20A and the outer peripheral surfaces 41a of the pin members 40 form the pressure contact surfaces T provided between the pin members 40 and the first member (the fixed hinge 20A) which are brought into contact with each other by the compression spring 50. The pressure contact surfaces T form tapered surfaces whose diameters are gradually reduced toward the pressure contact directions of the pin members 40.

On opposite surfaces of the head portions 41 to the support shafts 43 are formed into substantially conical-shaped support protrusions 41c in which central portions protrude most high, and peripheral portions are gradually reduced outward in the diametrical directions. The support protrusions 41c receive ends of the compression spring 50 so that the displacement of the compression spring 50 is suppressed.

Each of the support shafts 43 includes the rotating shaft portion 43a and the fixed shaft portion 43b. The substantially cylindrical-shaped rotating shaft portion 43a protrudes with a given height from the central portion of the end surface 41b of the head portion 41. In the support shaft 43, the fixed shaft portion 43b is located at a proximal end side as compared with the rotating shaft portion 43a. The fixed shaft portion 43b is fitted to the pin support hole 33a in the rotating hinge 30A. In the fixed shaft portion 43b, opposed surfaces in the circumferential direction are cut out in parallel to each other along the axial direction so as to have an irregular sectional shape. The irregular sectional shape of the fixed shaft portion 43b corresponds to the irregular shape of the pin support hole 33a in the rotating portion 33 of the rotating hinge 30A. The rotating shaft portion 43a is inserted into the pin insertion hole 25a of the fixed hinge 20A so as to freely rotate relative to the fixed hinge 20A. And, the fixed shaft portion 43b is fitted to the pin support hole 33a of the rotating hinge 30A so as to stop relative rotation of the rotating hinge 30A.

Now, an assembly procedure, a using method and effects of the above-described hinge device 10 will be described below.

Initially, the rotating portions 33 and 33 of the rotating hinge 30A are arranged on the receiving portions 27 and 27 of the fixed hinge 20A and the pair of pin support holes 33a and 33a of the rotating hinge 30A are coaxially arranged outside the pair of pin insertion holes 25a and 25a of the fixed hinge 20A to align both the holes 25a and 33a with each other.

Figure 3A:
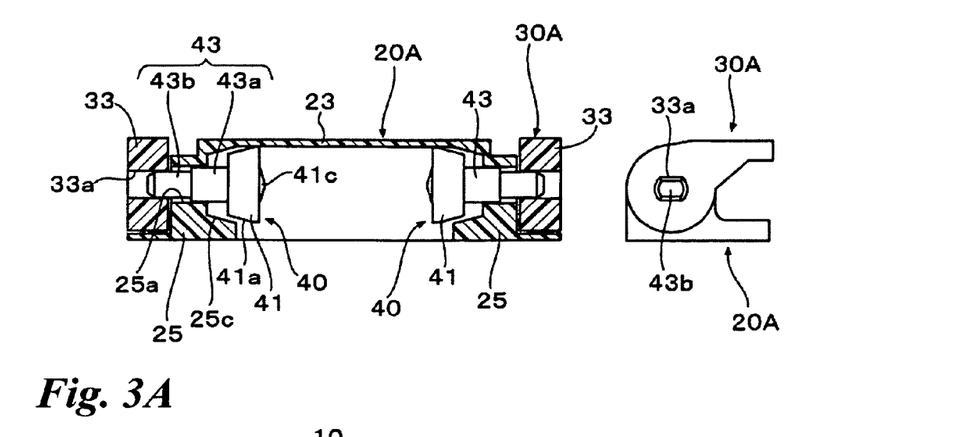
FIG. 3A is a sectional view and a side view when the hinge device is assembled.
Figure 3B:
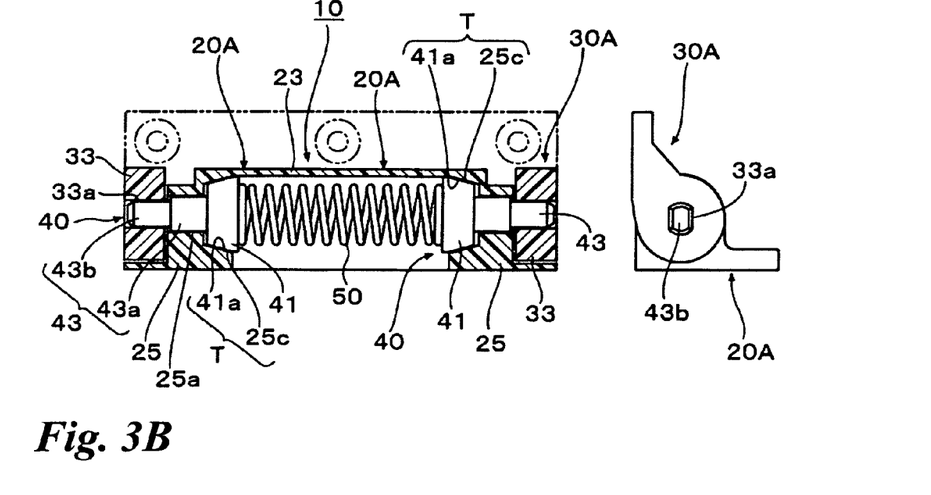
FIG. 3B is a sectional view and a side view after the hinge device is assembled.

After that, the pair of pin members 40 and 40 are respectively accommodated in the accommodation portion 23 of the fixed hinge 20A to insert the support shafts 43 into both the holes 25a and 33a (see FIG. 3A). The rotating shaft portions 43a are inserted into the pin insertion holes 25a so that the pin members 40 are rotatable with respect to the fixed hinge 20A, and the fixed shaft portions 43b are fitted to the pin support holes 33a so that the pin members 40 are not rotatable with respect to the rotating hinge 30A.

Then, the compression spring 50 is arranged between the pair of pin members 40 and 40. For example, after arranging one end of the compression spring 50 onto the support protrusion 41c of one pin member 40, the compression spring 50 is compressed against a resilient force, and the other end of the compression spring 50 is arranged onto the support protrusion 41c of the other pin member 40. Thus, the pin members 40 are respectively pressed so as to be separated from each other from the inner side to the outer side of the accommodation portion 23 by the resilient force of the compressed compression spring 50, and the hinge device 10 is assembled under a state that the outer peripheral surfaces 41a of the pin members 40 are brought into contact with the inner peripheral surfaces 25c of the fixed hinge 20A under pressure. When the resilient force of the compression spring 50 is strong, both ends of the compression spring 50 may be compressed by a jig so that an entire length thereof is suppressed, and then the compression spring 50 is accommodated in the accommodation portion 23. Then, the jig may be removed to restore the compression spring and arrange the both ends thereof onto the support protrusions 41c.

Subsequently, the hinges 20A and 30A are respectively fixed to the arm rest 1 and the lid 3, so that the lid 3 can be attached to the opening of the accommodation portion of the arm rest 1 so as to be opened and closed through the hinge device 10. As a result, as shown in FIG. 5, the accommodation portion (not shown in the drawing) in the arm rest 1 can be opened and closed through the upward/downward rotation of the lid 3 relative to the arm rest 1.

Then, in the hinge device 10, the compression spring 50 is arranged in a compressed state between the pair of pin members 40 and 40. Therefore, the pin members 40 are respectively pressed so as to be separated from each other by the resilient force of the compression spring 50, thereby bringing the outer peripheral surfaces 41a of the pin members 40 into contact with the inner peripheral surfaces 25c of the fixed hinge 20A, respectively. Thus, a braking force is generated by the pressure contact surfaces T and T at two positions (see FIG. 2).

In the hinge device 10, since the braking force generated in the pressure contact surfaces T and T is applied in the two positions, the braking force can be increased and stably applied. In the opening and closing operations of the lid 3, especially, when the lid 3 is in an opened state, the lid can be stopped at an arbitrary opening angle (free stop function), or the lid can be prevented from suddenly closed and slowly closed by a braking force.

When the lid 3 is opened or closed, since the fixed shaft portions 43b of the pin members 40 are fitted to the pin support holes 33a, the pin members 40 are rotated synchronously with the rotating hinge 30A fixed to the lid 3. Since the compression spring 50 is supported between the pin members 40, when the pin members 40 are rotated in accordance with the relative rotation of the fixed hinge 20A and the rotating hinge 30A as described above, the compression spring 50 is rotated synchronously with the pin members 40. Thus, the distortion of the compression spring 50 does not arise, and a pressing force of the compression spring 50 can be stably maintained for a long time.

In the hinge device 10, the support shafts 43 of the pin members 40 are respectively inserted into the pin insertion holes 25a of the fixed hinge 20A (the first member) and the pin support holes 33a of the rotating hinge 30A (the second member) so that the fixed hinge 20A and the rotating hinge 30A are rotatably supported at the two positions. Therefore, the rotating operations of both the hinges 20A and 30A are stabilized, and the lid 3 fixed thereto is smoothly and stably opened and closed.

Since the pair of pin members 40 and 40 are respectively brought into contact with the fixed hinge 20A as the first member under pressure of the one compression spring 50, a work or parts for preventing a slip-off is not necessary. Thus, the number of assembling processes or the number of parts in the hinge device can be reduced to lower a production cost.

In this embodiment, since the pressure contact surfaces T and T provided between the first member (the fixed hinge 20A) and the pair of pin members 40 and 40 are tapered to be gradually reduced in diameter toward the pressure contact directions of the pin members 40, respectively, the braking force can be increased due to a wedge effect by the tapered surfaces and the increase of sliding areas, thereby preventing the backlash of the pin members 40.

Figure 6:
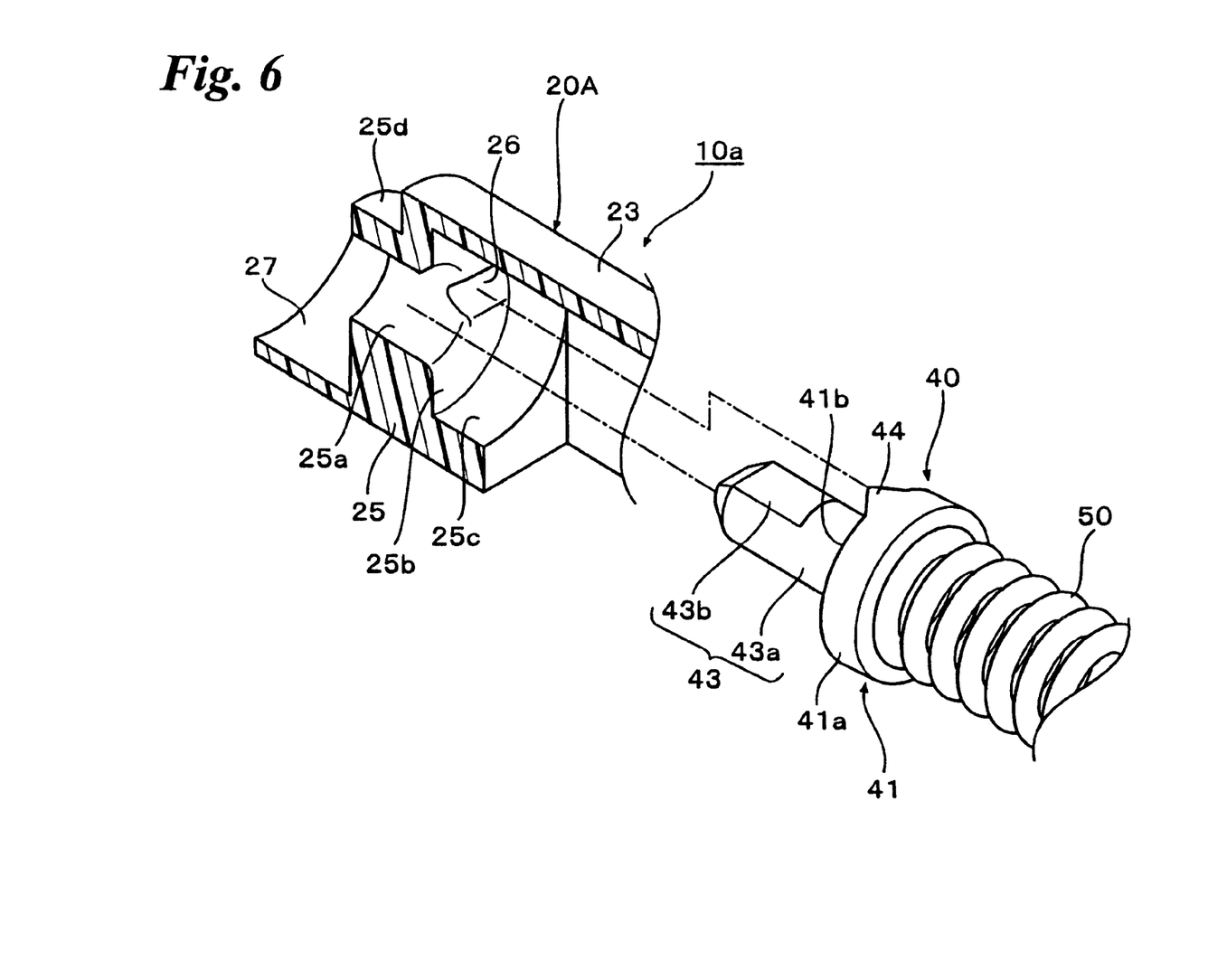
FIG. 6 is an enlarged perspective view of main portions showing a hinge device according to a second embodiment.

FIG. 6 shows a hinge device according to a second embodiment. The substantially same portions as those of the first embodiment are designated by the same reference numerals, and an explanation thereof will be omitted.

In the hinge device 10a of this embodiment, a pressure contact surface provided between each of pin members 40 and a first member (a fixed hinge 20A) which are brought into contact with each other by a compression spring 50 is formed by a stepped portion 25b formed in an opening peripheral edge of a pin insertion hole 25a of an accommodation portion 23 of the fixed hinge 20A and an end surface 41b of a head portion 41 of the pin member 40. The end surface 41b of the pin member 40 pressed by the compression spring 50 is brought into contact with the stepped portion 25b of the fixed hinge 20A under pressure. Further, at a given position of the stepped portion 25b of the fixed hinge 20A, a V-like groove 26 is formed. At a given position of the end surface 41b of the pin member 40, a V-like protrusion 44 is formed to be fitted to the groove 26 at a given angle.

In this embodiment, when the first member (the fixed hinge 20A) and a second member (a rotating hinge) are relatively rotated, since the protrusion 44 enters the groove 26 to engage therewith at the given angle with a sense of click, a relative rotating angle of the first member and the second member can be regulated to the given angle.

Figure 7:
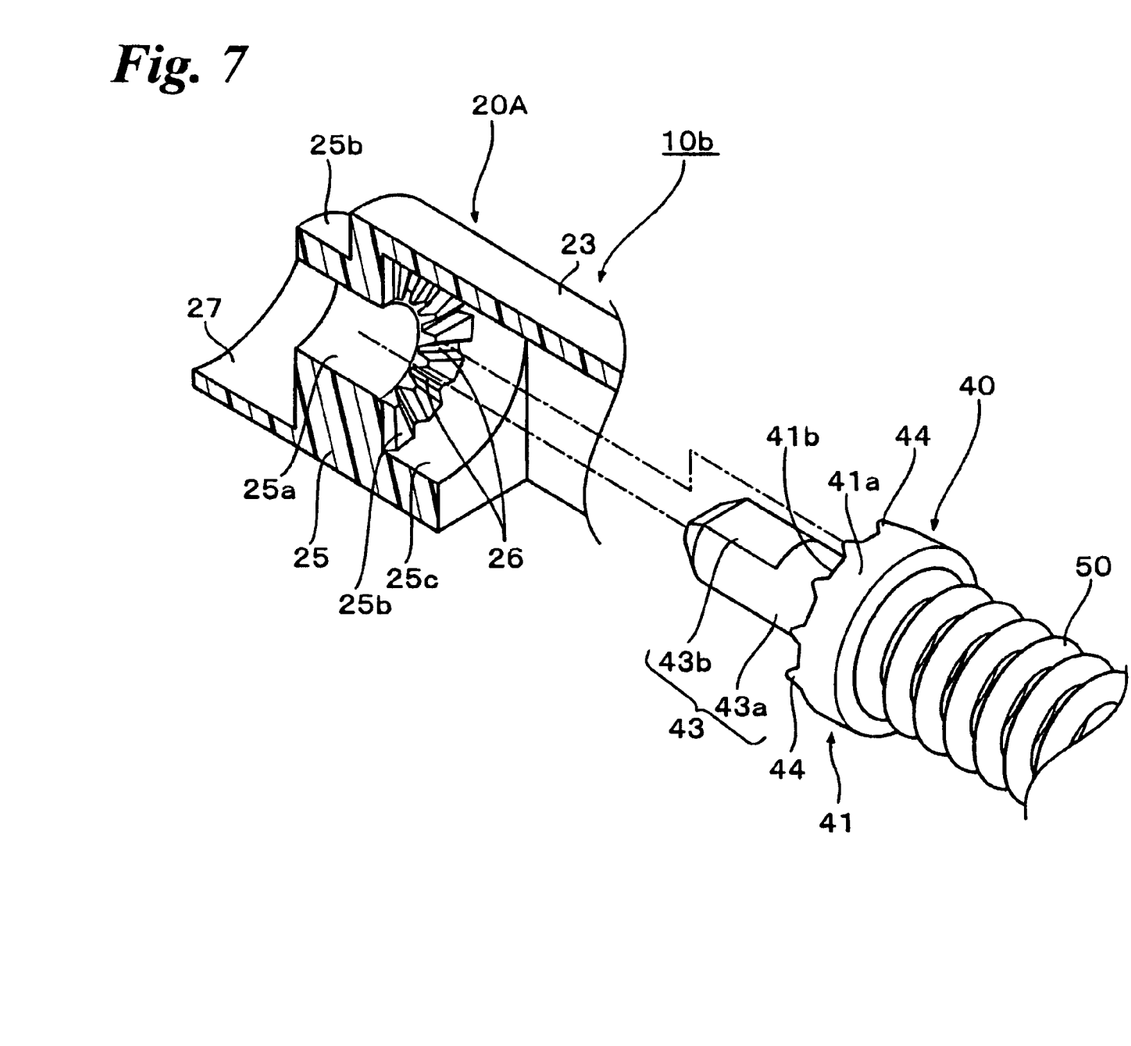
FIG. 7 is an enlarged perspective view of main portions showing a hinge device according to a third embodiment.

FIG. 7 shows a hinge device according to a third embodiment. The substantially same portions as those of the above-described embodiments are designated by the same reference numerals, and an explanation thereof will be omitted.

In the hinge device 10b of this embodiment, a pressure contact surface T is formed by a stepped portion 25b of a fixed hinge 20A and an end surface 41b of a pin member 40 as in the hinge device 10a of the second embodiment. The end surface 41b of the pin member 40 pressed by a compression spring 50 is brought into contact with the stepped portion 25b of the fixed hinge 20A, under pressure.

In the stepped portion 25b of the fixed hinge 20A, a plurality of V-like grooves 26 are formed at given intervals along the circumferential direction thereof. Also, in the end surface 41b of the pin member 40, a plurality of V-like protrusions 44 protrude at given intervals along the circumferential direction thereof.

In this embodiment, when a first member (the fixed hinge 20A) and a second member (a rotating hinge) are relatively rotated, since the protrusions 44 are intermittently engaged with the grooves 26 at short intervals with a sense of click. Accordingly, the rotating angle of the second member relative to the first member can be more finely adjusted.

Figure 8:
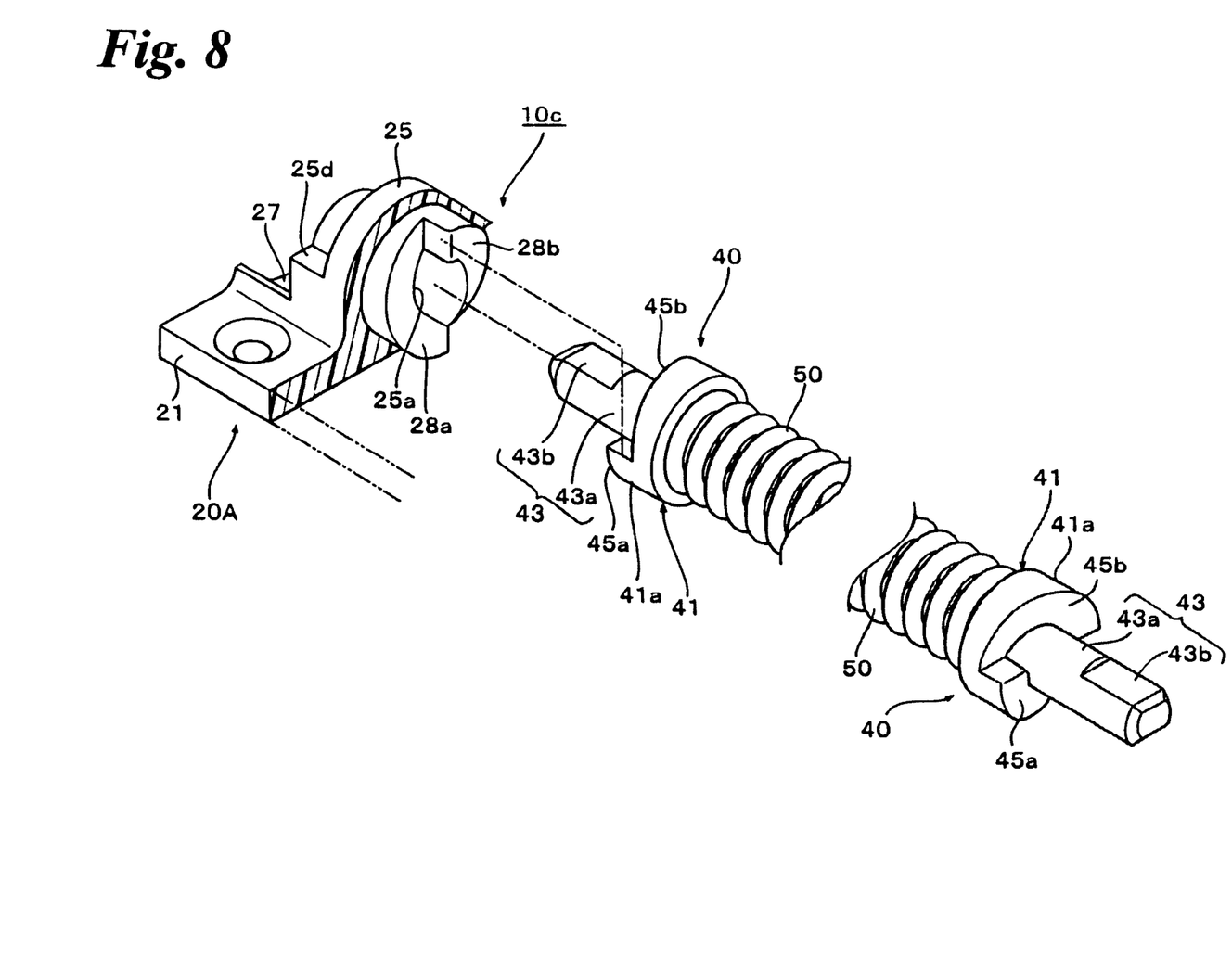
FIG. 8 is an enlarged perspective view of main portions showing a hinge device according to a fourth embodiment.
Figure 9A:
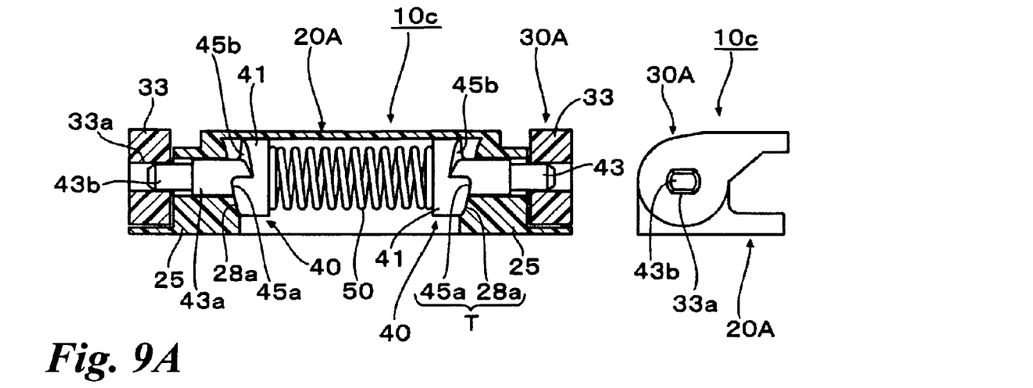
FIG. 9A shows a sectional view and a side view under a state that a first member and a second member come close to each other.
Figure 9B:
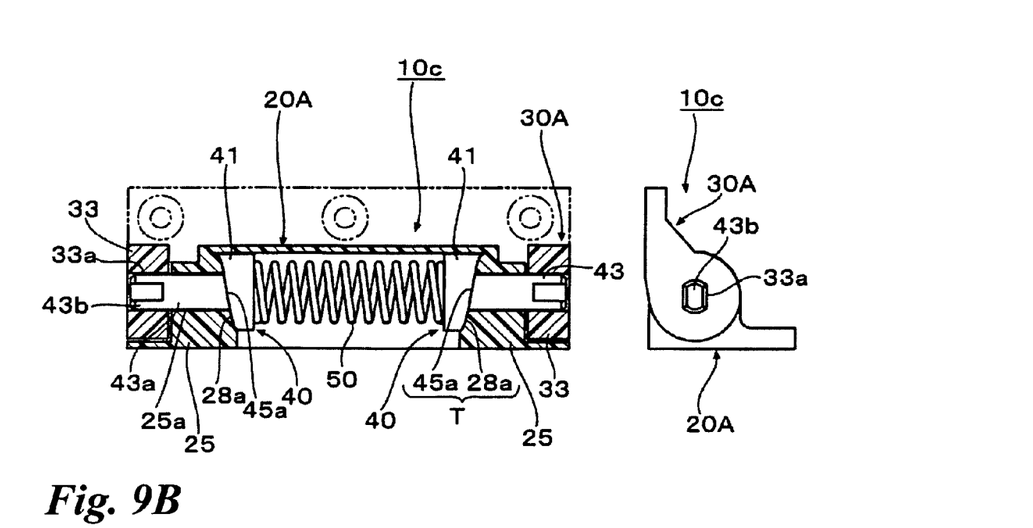
FIG. 9B shows a sectional view and a side view under a state that the first member and the second member are separated from each other.

FIGS. 8 and 9 show a hinge device according to a fourth embodiment. The substantially same portions as those of the above-described embodiments are designated by the same reference numerals, and an explanation thereof will be omitted.

In the hinge device 10c of this embodiment, a pressure contact surface T is different from the pressure contact surfaces of the first to third embodiments. As shown in FIG. 8, an inner end surface of a wall portion 25 of a fixed hinge 20A includes inclined surfaces 28a and 28b which are arranged at right and left sides with respect to a plane being perpendicular to an attachment portion 21 and passing an axis of a pin insertion hole 25a as a boundary. The inclined surfaces 28a and 28b are point-symmetric with respect to the axis of the pin insertion hole 25a as a center. Namely, as viewed from an inner end side of the pin insertion hole 25a, both the inclined surfaces 28a and 28b are gradually lowered along a clockwise direction (a direction for opening a lid 3 connected to a rotating hinge 30A).

On the other hand, an end surface of a support shaft 43 side of a head portion 41 of a pin member 40 includes inclined surfaces 45a and 45b corresponding to the inclined surfaces 28a and 28b of the fixed hinge 20A.

In FIG. 8, the pin member 40 and the fixed hinge 20A in the left side of the drawing are shown. Inclined surfaces of a pin member 40 in the right side of FIG. 8 and a fixed hinge 20A which is not shown in FIG. 8 are reversely inclined with respect to the inclined surfaces of those in the left side.

In the pin member 40, as shown in FIG. 9A, when the rotating hinge 30A is located at a position parallel to the fixed hinge 20A, the inclined surfaces 28a and 28b of the fixed hinge 20A are brought into contact with the inclined surfaces 45a and 45b of the pin member 40 under pressure respectively at their high portions. When the rotating hinge 30 is rotated substantially at 90° relative to the fixed hinge 20A, low portions of the inclined surfaces 45a and 45b of the pin member 40 are brought into contact with the high portions of the inclined surfaces 28a and 28b of the fixed hinge 20A under pressure (see FIG. 9B)). In this embodiment, the inclined surfaces 28a and 28b of the fixed hinge 20A and the inclined surfaces 45a and 45b of the pin member 40 form a pressure contact surface T. In accordance with a rotation of the hinge, a space between the pin members 40 is changed to change the length of a compression spring 50 in the axial direction.

In this embodiment, when a first member (the fixed hinge 20A) and a second member (the rotating hinge 30A) are relatively rotated, the pin members 40 and 40 come close to each other or are separated from each other so that a pressure contact force to the pressure contact surfaces T by the compression spring 50 is changed. Thus, a braking force can be changed depending on a rotating angle.

In this embodiment, the above-described inclined surfaces 28a, 28b and 45a and 45b are provided. Thus, when the rotating hinge 30A is located at a position substantially parallel to the fixed hinge 20A, the length of the compression spring 50 in the axial direction is small. Accordingly, the pin members 40 are pressed by a strong resilient force and a high braking force is applied. On the other hand, when the rotating hinge 30A is rotated to be opened relative to the fixed hinge 20A, the pair of pin members 40 and 40 are moved so as to be separated from each other. Thus, since the length of the compression spring 50 in the axial direction is large, a pressing force to the pin members 40 is gradually weakened so that the braking force is gradually weakened.

In a case where the hinge device 10c is used to open and close the lid of an arm rest 1, when rotating the rotating hinge 30A relative to the fixed hinge 20A upward, the length of the compression spring 50 in the axial direction is gradually increased to weaken the braking force. Although a braking force is weak in this state, since an inclination angle is large, the lid can be fixed even by the relatively weak braking force and the lid can be smoothly opened. On the other hand, when the lid 3 is closed, the length of the compression spring 50 in the axial direction is gradually decreased to gradually apply a strong braking force. Thus, the lid can be fixed even at a small inclination angle and the lid 3 can be slowly closed.

Figure 10:
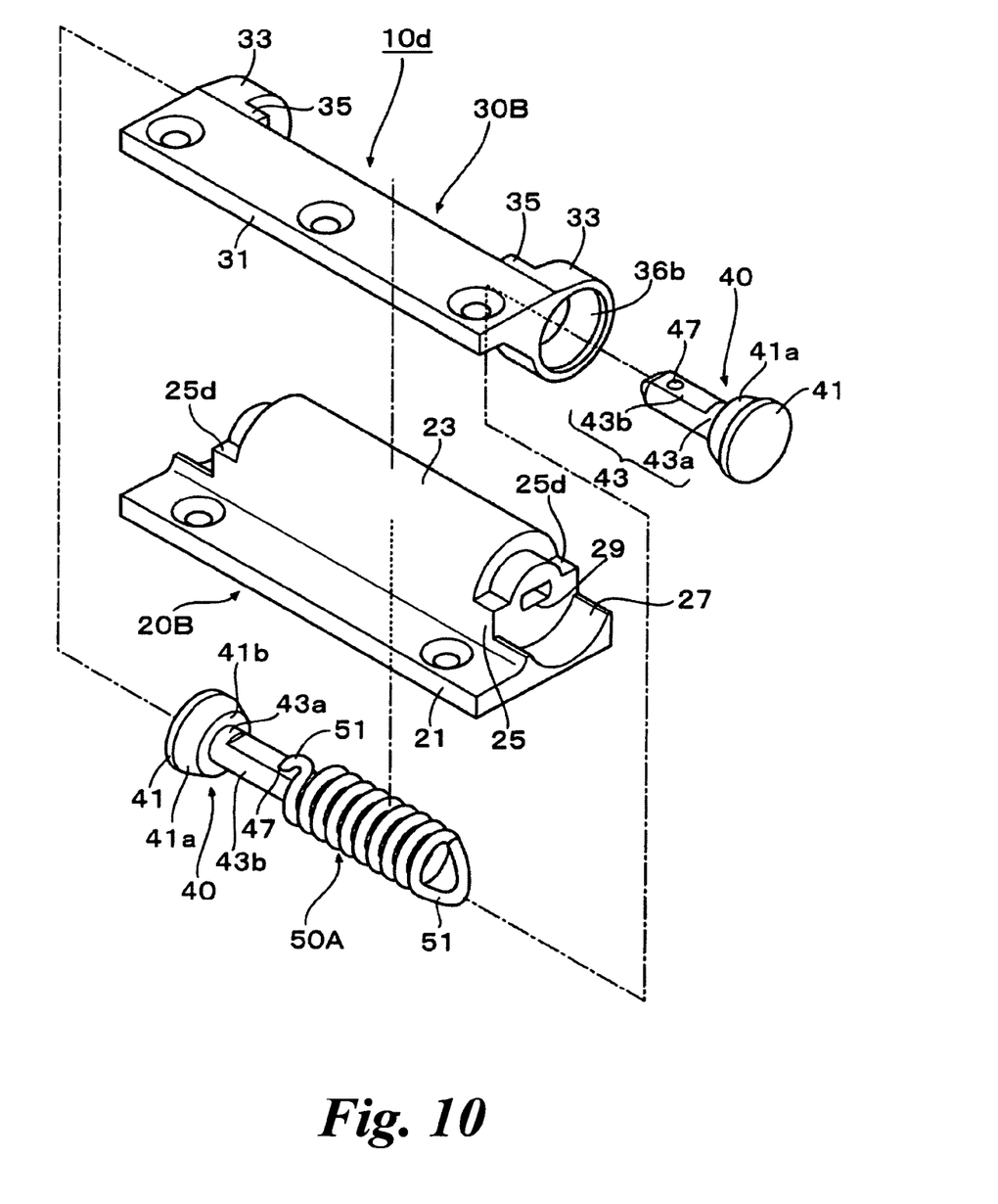
FIG. 10 is an exploded perspective view showing a hinge device according to a fifth embodiment.
Figure 11:
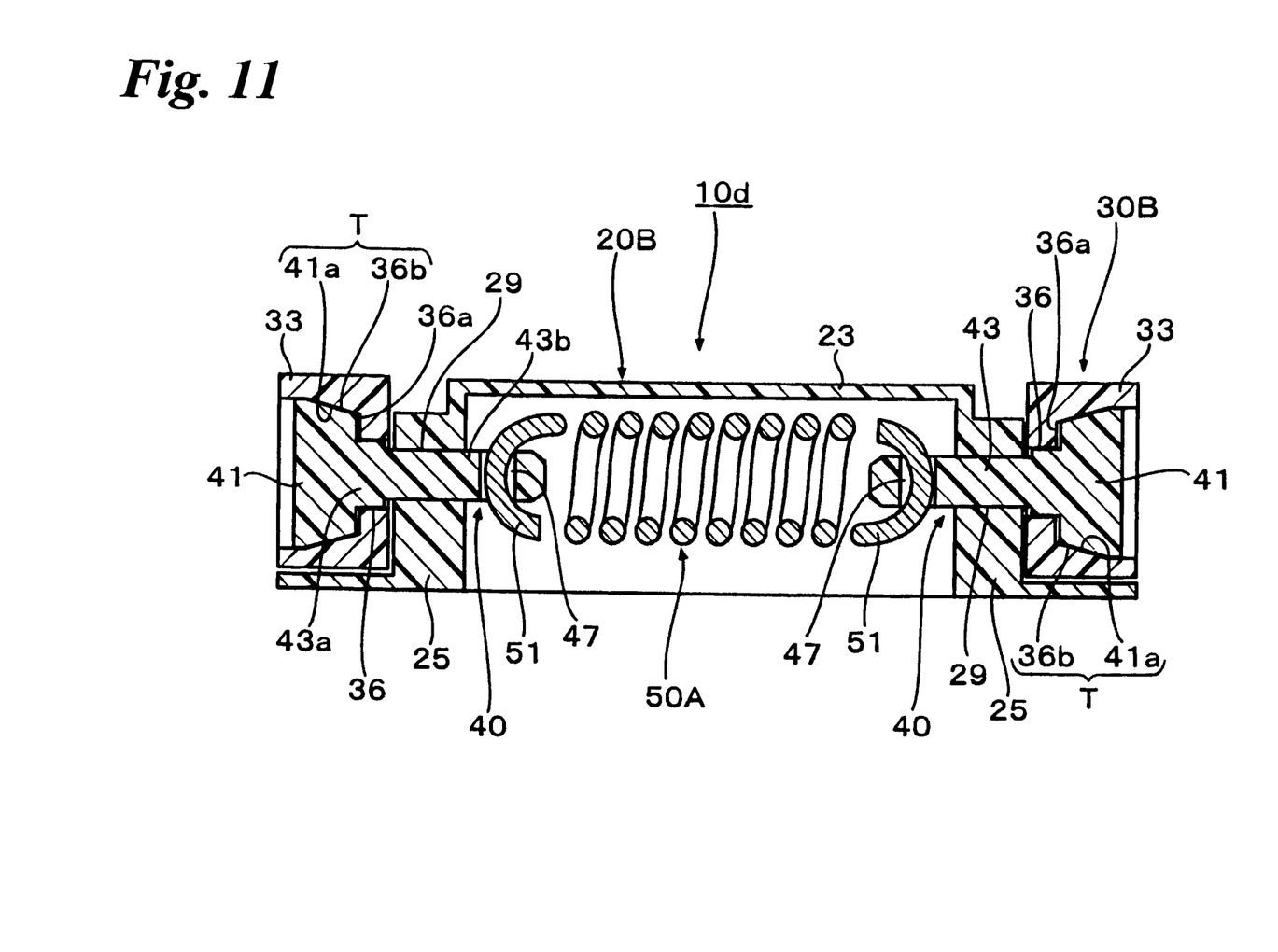
FIG. 11 is a sectional view of the hinge device.

FIGS. 10 and 11 show a hinge device according to a fifth embodiment. The substantially same portions as those of the above-described embodiments are designated by the same reference numerals, and an explanation thereof will be omitted.

The hinge device 10d of the fifth embodiment includes a rotating hinge 30B having a pair of pin insertion holes 36 and 36, a fixed hinge 20B having a pair of pin support holes 29 and 29, a pair of pin members 40 and 40 for rotatably supporting both the fixed hinge 20B and the rotating hinge 30B, an extension spring 50A arranged between both the pin members 40 and 40 to bring the pin members 40 into contact with the rotating hinge 30B and apply a rotation braking force between each pin member 40 and the rotating hinge 30B, and pressure contact surfaces T provided between the pin members 40 and the rotating hinge 30B brought into contact with each other by the extension spring 50A.

While the hinge device shown in FIGS. 1 to 9B use the compression spring 50, the hinge device 10d of this embodiment uses the extension spring 50A. The rotating hinge 30B is functioning as a first member and the fixed hinge 20B is functioning as a second member. This shows a relation reverse to that of the hinge device shown in FIGS. 1 to 9B (in the hinge device shown in FIGS. 1 to 9B, the fixed hinge 20A is the first member and the rotating hinge 30A is the second member). However, since the basic structures of the fixed hinge and the rotating hinge are the same, an explanation thereof will be omitted.

As shown in FIGS. 10 and 11, at central portions of rotating portions 33 and 33 of the rotating hinge 30B (the first member), substantially-circular-shaped pin insertion holes 36 are formed to receive rotating shaft portions 43a of the pin members 40 so as to freely rotate. Through stepped portions 36a expanded in opening peripheral edges of the pin insertion holes 36, tapered inner peripheral surfaces 36b are formed to be gradually enlarged in diameter toward an outer side of the rotating portions 33. On the other hand, in central portions of wall portions 25 and 25 of the fixed hinge 20B (the second member), pin support holes 29 having an irregular shape are configured to receive fixed shaft portions 43b of the pin members 40 so as to be fixed. At ends of support shafts 43 of the pin members 40, hook holes 47 are formed to be engaged with hook portions 51 of the extension spring 50A.

After the pin insertion holes 36 and 36 of the rotating hinge 30B (the first member) are coaxially arranged outside the pin support holes 29 and 29 of the fixed hinge 20B (the second member), the pin members 40 and 40 are respectively inserted from the outer sides of the rotating portions 33 and 33 of the rotating hinge 30B so that the support shafts 43 are inserted into both the holes 29 and 36. Thus, the rotating shaft portions 43a are inserted into the pin insertion holes 36 so that the pin members 40 are rotatable with respect to the rotating hinge 30B, and the fixed shaft portions 43b are fitted to the pin support holes 29 so that the pin members 40 are not rotatable with respect to the fixed hinge 20B.

After that, the extension spring 50A is arranged between the pair of pin members 40 and 40 to engage the hook portions 51 at both the axial-direction ends respectively on the hook holes 47 of the pin members 40. Thus, the pair of pin members 40 and 40 respectively arranged outside the wall portions 25 and 25 of the fixed hinge 20B are pulled inside so as to come close to each other. As a result, outer peripheral surfaces 41a and 41a of the pin members 40 and 40 are brought into contact with both the inner peripheral surfaces 36b and 36b of the rotating hinge 30B under pressure, and a braking force is generated in the pressure contact surfaces T and T provided by the inner peripheral surfaces 36b and the outer peripheral surfaces 41a. Since the braking force generated in the pressure contact surfaces T and T are applied in two positions as in the hinge device shown in FIGS. 1 to 5, the braking force can be increased and stably applied.

In the hinge device 10d, since the fixed shaft portions 43b of the pin members 40 are fixed to the pin support holes 29 of the fixed hinge 20B so as not to be rotatable, only the rotating hinge 30B is rotated relative to the fixed hinge 20B. Conversely, when the fixed hinge 20B is rotated relative to the rotating hinge 30B, the pin members 40 and 40 are synchronously rotated.

As described above, since the extension spring 50A is supported between the pin members 40 and 40, when the pin members 40 and 40 are rotated in accordance with the relative rotation of the fixed hinge 20B and the rotating hinge 30B, the expression spring 50A is rotated synchronously with the pin members 40 and 40. Thus, the distortion of the expression spring 50A does not arise and a pressing force of the expression spring can be stably maintained for a long time.

In the hinge device 10d, since support shafts 43 of the pin members 40 are respectively inserted into the pin insertion holes 36 of the rotating hinge 30B (the first member) and the pin support holes 29 of the fixed hinge 20B (the second member) so that both the fixed hinge 20B and the rotating hinge 30B are supported so as to freely rotate in the two positions, the rotating operations of both the hinges 20B and 30B are stabilized. Further, since the pair of pin members 40 and 40 are respectively brought into contact with the rotating hinge 30B as the first member by the extension spring 50A, the number of parts in the hinge device can be reduced to lower a production cost.

In the hinge device of this embodiment, the structures used in the embodiments shown in FIGS. 6 to 9B may be employed.

What is claimed is:

1. A hinge device comprising:
   a first member including a cylindrical accommodation portion including an opening exposing an interior of the cylindrical accommodation portion; and
   a pair of wall portions disposed to close both ends of the cylindrical accommodation portion, the pair of wall portions including a pair of coaxial pin insertion holes, respectively;
   a second member including a pair of rotating portions disposed on outer sides of the pair of wall portions of the first member, the pair of rotating portions including a pair of coaxial pin support holes, respectively;
   a pair of pin members respectively inserted into the pin insertion holes and the pin support holes to support the first member and the second member, the pin members being rotatable with respect to the pin insertion holes and not rotatable with respect to the pin support holes;
   a compression spring supported between the pin members to push the pin members toward the wall portions of the first member; and
   pressure contact surfaces provided between the pin members and the first member being brought into contact with each other by the compression spring, the pressure contact surfaces being provided within a space defined by the cylindrical accommodation portion and the wall portions, wherein the opening of the cylindrical accommodation portion is configured to receive the pair of pin members and the compression spring therethrough.

2. The hinge device of claim 1, wherein each of the pressure contact surfaces is tapered to be reduced in diameter in a direction from the compression spring toward the pin support holes.

3. The hinge device of claim 1, wherein, in each of the pressure contact surfaces, one of the first member and the pin member includes a groove, and the other of the first member and the pin member includes a protrusion to be fitted to the groove at a given angle.

4. The hinge device of claim 1, wherein, in each of the pressure contact surfaces, the first member has an inclined surface inclined to change in height along a rotating direction, and the pin member includes another inclined surface inclined to change in height along an opposite direction to the rotating direction.

5. The hinge device of claim 1, wherein each of the pressure contact surfaces is tapered from a large diameter portion of the pressure contact surfaces closer to the compression spring towards a small diameter portion of the pressure contact surfaces closer to the pin insertion hole.

6. The hinge device of claim 5 wherein the pair of pin members further comprise:
a rotating shaft portion adjacent to the small diameter portion of the pressure surfaces and having a diameter less than a diameter of the small diameter portion of the pressure contact surface.

7. The hinge device of claim 6, wherein a fixed shaft portion of the pin members comprises a diameter less than the diameter of the rotating shaft portion and is located at a distal end of the rotating shaft portion opposite the pressure contact surface.

8. The hinge device of claim 7, wherein a surface of the pin members which is adjacent to the compression spring comprises a substantially conical-shaped support protrusion.

9. The hinge device of claim 8, wherein the support protrusion protrudes in a direction away from the end fixed shaft portion of the pin members.

10. The hinge device of claim 9, wherein the end fixed shaft portion of the pin members is inserted into the support holes and includes a first shape comprising a pair of opposite surfaces in a radial direction formed in parallel to each other.

11. The hinge device of claim 10, wherein the pin support holes comprise a second shape which corresponds to the first shape of the end fixed shaft portion of the pin members.

12. The hinge device of claim 11, wherein a pin member of the pin members comprises an integral member.

13. The hinge device of claim 1, wherein a portion of the first member comprises a cut-out portion.

14. The hinge device of claim 13, wherein a portion of the second member comprises a rib formed to correspond to the cut-out portion of the first member.

15. The hinge device of claim 1, wherein each of the pin members includes:
a head portion comprising a cylindrical shape;
a support shaft extending from a side surface of the head portion; and
a conical support protrusion protruding from an other side surface of the head portion, and
wherein each of both ends of the compression spring is supported around the corresponding conical support protrusion.

* * * * *